US012381058B2

(12) United States Patent
Ogawa et al.

(10) Patent No.: US 12,381,058 B2
(45) Date of Patent: Aug. 5, 2025

(54) ELECTROMAGNETIC RELAY

(71) Applicant: OMRON Corporation, Kyoto (JP)

(72) Inventors: Shinichi Ogawa, Kyoto (JP); Ryota Minowa, Kyoto (JP)

(73) Assignee: OMRON CORPORATION, Kyoto (JP)

(*) Notice: Subject to any disclaimer, the term of this patent is extended or adjusted under 35 U.S.C. 154(b) by 230 days.

(21) Appl. No.: 18/547,509

(22) PCT Filed: Jan. 18, 2022

(86) PCT No.: PCT/JP2022/001495
§ 371 (c)(1),
(2) Date: Aug. 23, 2023

(87) PCT Pub. No.: WO2022/185747
PCT Pub. Date: Sep. 9, 2022

(65) Prior Publication Data

US 2024/0055209 A1 Feb. 15, 2024

(30) Foreign Application Priority Data

Mar. 5, 2021 (JP) ................................ 2021-035746

(51) Int. Cl.
*H01H 50/58* (2006.01)
*H01H 50/54* (2006.01)

(52) U.S. Cl.
CPC .......... *H01H 50/58* (2013.01); *H01H 50/546* (2013.01)

(58) Field of Classification Search
CPC ............................ H01H 50/58; H01H 50/546
(Continued)

(56) References Cited

U.S. PATENT DOCUMENTS 5,892,194 A * 4/1999 Uotome ............... H01H 51/065 335/154
6,229,416 B1 * 5/2001 Ebihara ................ H01H 51/065 335/131

(Continued)

FOREIGN PATENT DOCUMENTS

JP 2012-22984 A 2/2012
JP 2014-110165 A 6/2014

(Continued)

OTHER PUBLICATIONS

The International Search Report of International Application No. PCT/JP2022/001495 issued on Mar. 29, 2022.

(Continued)

*Primary Examiner* — Alexander Talpalatski
(74) *Attorney, Agent, or Firm* — SHINJYU GLOBAL IP

(57) ABSTRACT

An electromagnetic relay includes a movable contact piece, a drive shaft, a spacer, a contact spring, and a stopper. The drive shaft is positioned apart from the movable contact piece in a second direction from the first fixed contact toward the first movable contact. The drive shaft includes a shaft portion and a flange portion projecting from the shaft portion. The spacer is positioned between the movable contact piece and the drive shaft. The contact spring is disposed between the spacer and the drive shaft. The stopper includes a holding portion and a press portion. The holding portion holds, together with the spacer, the movable contact piece in the movement direction of the movable contact piece. The press portion is pressed in the second direction by the flange portion of the drive shaft when the first movable contact is separated from the first fixed contact.

11 Claims, 8 Drawing Sheets

(58) Field of Classification Search
USPC .................................................. 335/126, 131
See application file for complete search history.

(56) References Cited

U.S. PATENT DOCUMENTS

| | | | | |
|---|---|---|---|---|
| 8,269,585 | B2 * | 9/2012 | Choi .................... | H01H 1/2008 335/196 |
| 9,269,507 | B2 * | 2/2016 | Enomoto ................. | H01H 1/54 |
| 9,881,758 | B2 * | 1/2018 | Uruma ................. | H01H 50/546 |
| 10,032,587 | B2 * | 7/2018 | Yang ...................... | H01H 50/36 |
| 2013/0115807 | A1 | 5/2013 | Enomoto et al. | |
| 2014/0014622 | A1 | 1/2014 | Naka et al. | |
| 2015/0255236 | A1 | 9/2015 | Enomoto et al. | |
| 2019/0006140 | A1 | 1/2019 | Shi et al. | |
| 2021/0193421 | A1 | 6/2021 | Yoo | |

FOREIGN PATENT DOCUMENTS

| | | | |
|---|---|---|---|
| JP | 2014-132595 | A | 7/2014 |
| JP | 5727862 | B2 | 6/2015 |
| JP | 2019-505973 | A | 2/2019 |
| JP | 2021-536100 | A | 12/2021 |
| WO | 2020/045859 | A1 | 3/2020 |

OTHER PUBLICATIONS

The Written Opinion of the International Searching Authority of International Application No. PCT/JP2022/001495 issued on Mar. 29, 2022.

The Office Action of the corresponding Japanese application No. 2021-035746 issued on Oct. 3, 2023.

* cited by examiner

ELECTROMAGNETIC RELAY

CROSS-REFERENCE TO RELATED APPLICATION

This application is the U.S. National Phase of International Application No. PCT/JP2022/001495, filed on Jan. 18, 2022. That application claims priority to Japanese Patent Application No. 2021-035746, filed Mar. 5, 2021. The contents of those two applications are incorporated by reference herein in their entireties.

FIELD

The claimed invention relates to electromagnetic relays.

BACKGROUND

Japanese Patent No. 5727862 discloses an electromagnetic relay including a fixed terminal including a fixed contact, a movable contact piece including a movable contact configured to contact the fixed contact, a drive shaft, a contact spring, and a driving device. The driving device is configured to move the drive shaft by electromagnetic force. As the drive shaft moves, the movable contact piece moves to bring the movable contact into contact with the fixed contact.

In the electromagnetic relay disclosed in Japanese Patent No. 5727862, the drive shaft and the contact spring are arranged in contact with the movable contact piece. Hence, when the drive shaft moves, the movable contact piece slides with the drive shaft and the contact spring, which may generate abrasion power.

SUMMARY

An object of the claimed invention is to decrease the generation of abrasion powder from the movable contact piece in an electromagnetic relay.

An electromagnetic relay according to one aspect of the claimed invention includes a first fixed terminal, a second fixed terminal, a movable contact piece, a drive shaft, a spacer, a contact spring, a stopper, and a driving device. The first fixed terminal includes a first fixed contact. The second fixed terminal includes a second fixed contact. The movable contact piece includes a first movable contact disposed to face the first fixed contact and a second movable contact disposed to face the second fixed contact. The movable contact piece is movable in a movement direction including a first direction from the first movable contact toward the first fixed contact and a second direction from the first fixed contact toward the first movable contact. The drive shaft is positioned apart from the movable contact piece in the second direction. The drive shaft includes a shaft portion extending in the movement direction and a flange portion projecting from the shaft portion. The spacer is positioned between the movable contact piece and the drive shaft. The contact spring is disposed between the spacer and the drive shaft and configured to urge the spacer and the drive shaft away from each other in the movement direction. The stopper is coupled to the spacer. The stopper includes a holding portion and a press portion. The holding portion is configured to hold, together with the spacer, the movable contact piece in the movement direction. The press portion is configured to be pressed in the second direction by the flange portion of the drive shaft in a state where the first movable contact is spaced from the first fixed contact. The driving device is configured to move the drive shaft in the movement direction.

In this electromagnetic relay, the drive shaft is disposed apart from the movable contact piece, and the contact spring is disposed between the spacer and the drive shaft. That is, since the movable contact piece are not in direct contact with the drive shaft and the contact spring, no abrasion powder is generated due to sliding between the drive shaft of the movable contact piece and the contact spring. As a result, generation of abrasion powder from the movable contact piece can be decreased. Also, the stopper is pressed in the second direction by the flange portion of the drive shaft in a state where the first movable contact is spaced from the first fixed contact. As a result, the movable contact piece can be firmly fixed to the spacer by the stopper in the direction of movement.

The spacer may include a positioning portion to position the movable contact piece in the longitudinal direction and the lateral direction of the movable contact piece. The movable contact piece may include an engaging portion to engage with the positioning portion. In this case, displacement of the movable contact piece with respect to the spacer in the lateral and longitudinal directions can be decreased.

The stopper may be connected to the spacer by snap-fit. In this case, the movable contact piece can be fixed to the spacer with a simple configuration. Moreover, the snap-fit connection reduces the manufacturing cost compared to the case where the spacer and the movable contact piece are fixed together by insert molding for example.

The spacer may include a pair of held portions configured to be held by the stopper in the lateral direction of the movable contact piece. The stopper may further include a pair of side portions to hold the pair of held portions, and a pair of claw portions to engage with ends of the pair of held portions in the second direction. In this case, this simple configuration enables the snap-fit connection between the stopper and the spacer.

The pair of claw portions may have a surface that is directed in the second direction and that inclines in the second direction from an inside to an outside. In this case, the snap-fit connection between the stopper and the spacer is facilitated.

The electromagnetic relay may further include a wall arranged to surround the pair of side portions in the lateral direction of the movable contact piece. In this case, decoupling of the stopper from the spacer becomes less likely to occur by the wall.

The press portion of the stopper may be located on a pair of claw portions. In this case, the pair of claw portions can function as a press portion, which simplifies the configuration of the stopper.

The stopper may be comprised of insulating material. In this case, the stopper ensures insulation between the contact device and the driving device.

The spacer may include a gate port through which resin is injected to mold the spacer. The gate port of the spacer may be covered with the movable contact piece. In this case, debris generated from the gate port of the spacer is less likely to adhere to the contact.

The stopper may include a gate port into which resin is injected to mold the stopper. The gate port of the stopper may be covered with the movable contact piece. In this case, it is possible to prevent dust generated from the gate port of the stopper from adhering to the contact.

The spacer may include a spring receiving portion that is open in the second direction. The flange portion may be located in the spring receiving portion. In this case, the flange portion is able to close the opening of the spring receiving portion, and thereby adhesion of abrasion powder, which is generated by sliding of the contact spring, to the contact can be decreased.

DETAILED DESCRIPTION

Figure 1:
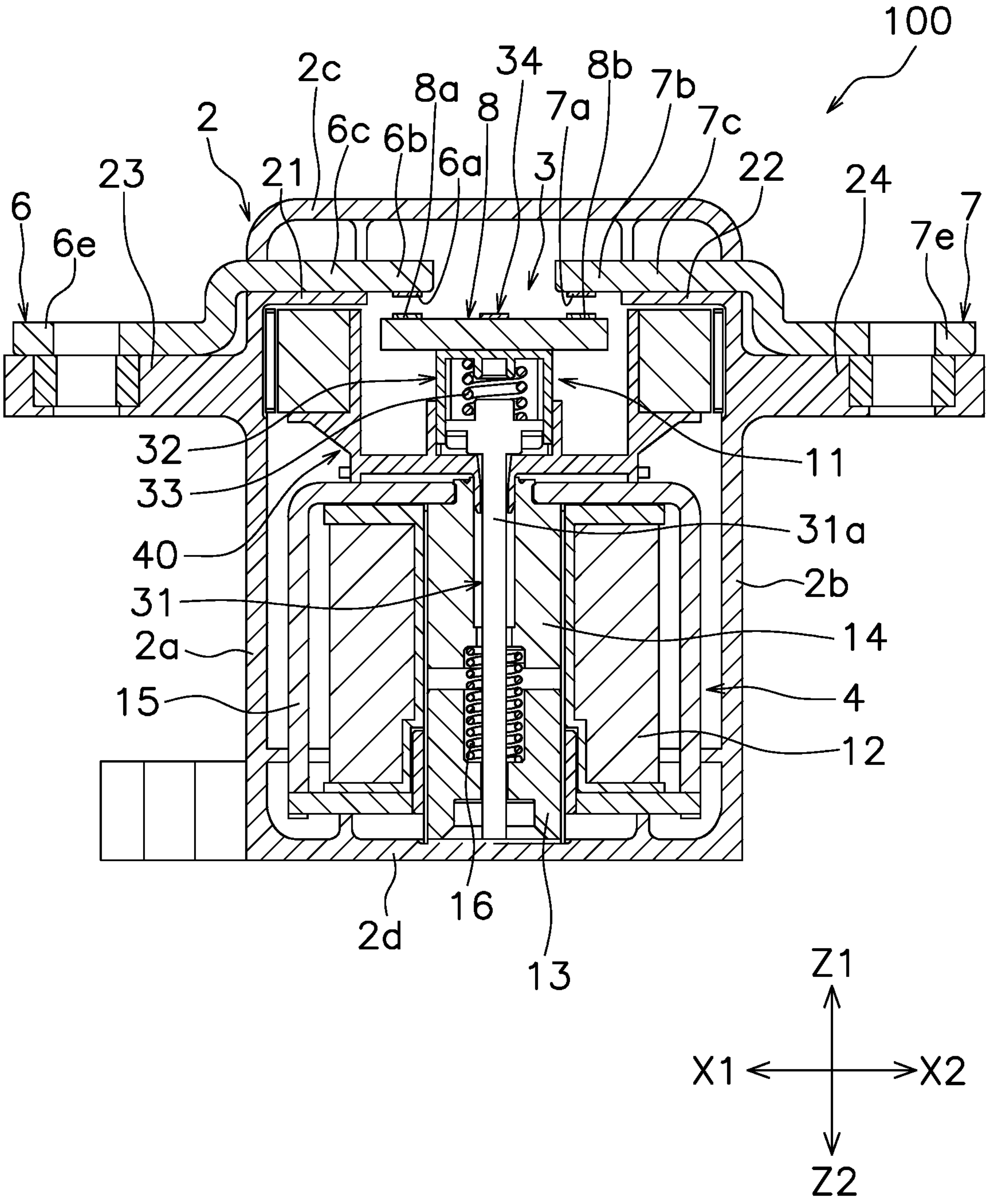
FIG. 1 is a cross-sectional view of an electromagnetic relay in accordance with the claimed invention, cut along a plane orthogonal to its front-rear direction.
Figure 2:
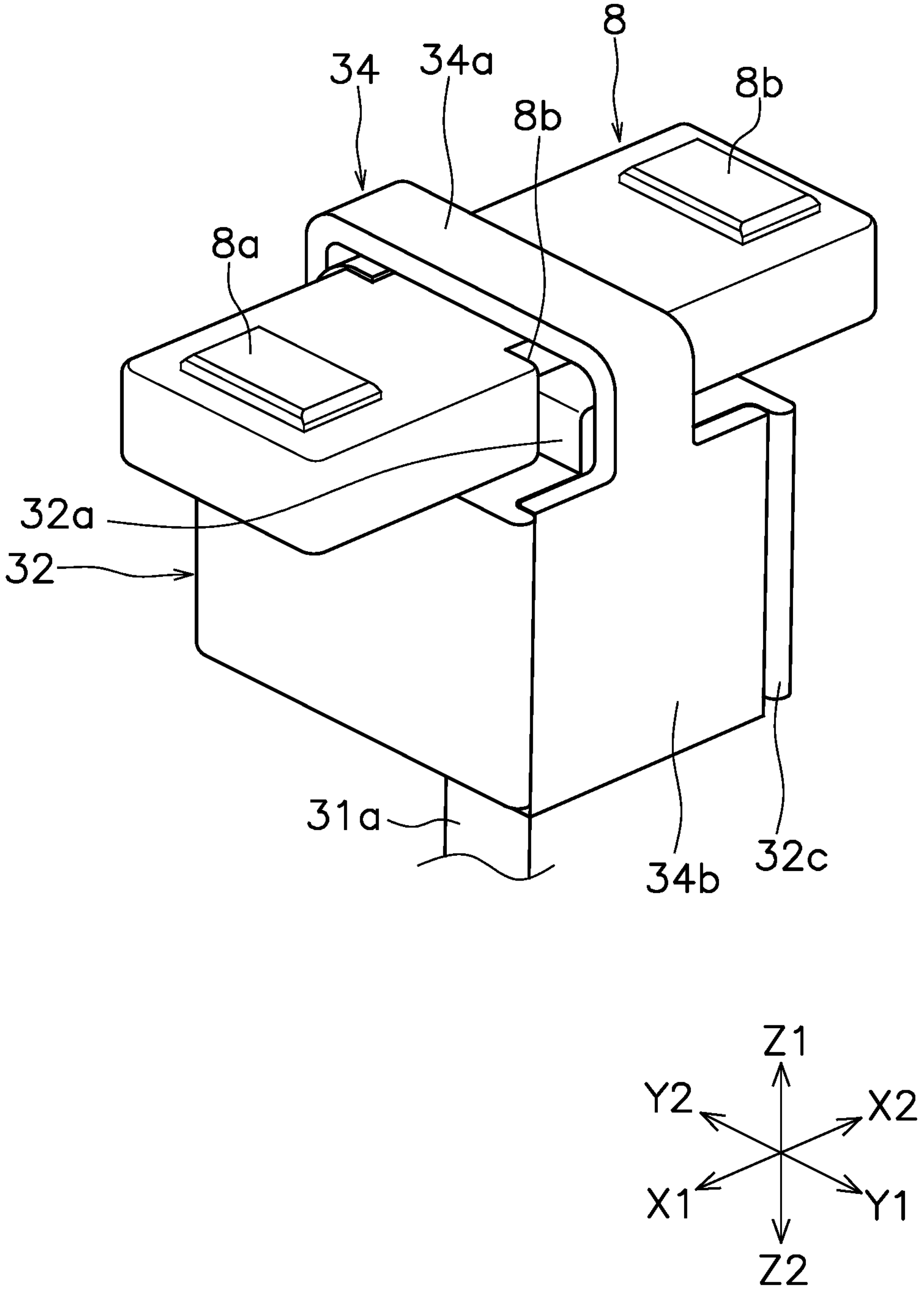
FIG. 2 is a perspective view of a movable contact piece and surrounding components.

An embodiment of an electromagnetic relay 100 according to one aspect of the claimed invention will be described below with reference to the drawings. When referring to the drawings in the description below, the X1 direction is the leftward direction, the X2 direction is the rightward direction, the Y1 direction is the forward direction, the Y2 direction is the rearward direction, the Z1 direction is the upward direction, and the Z2 direction is the downward direction. These directions are defined for convenience of explanation, and do not limit the directions in which the electromagnetic relay 100 is arranged. In the present embodiment, the Z1 direction is an example of a first direction, and the Z2 direction is an example of a second direction. Also, the up-down direction is an example of a movement direction.

As shown in FIG. 1, the electromagnetic relay 100 includes a case 2, a contact device 3, and a driving device 4.

The case 2 may be a generally rectangular box in shape and is comprised of insulating material such as resin. The case 2 includes a left wall 2*a*, a right wall 2*b*, an upper wall 2*c*, a lower wall 2*d*, and front and rear walls (not shown). Each of these walls is an outer wall of the case 2. The case 2 further includes inner support portions 21 and 22 and outer support portions 23 and 24.

The inner support portion 21 extends rightward from an inner surface of the left wall 2*a*. The inner support portion 22 extends leftward from an inner surface of the right wall 2*b*. The inner support portions 21 and 22 each have a flat upper surface.

The outer support portion 23 extends leftward from an outer surface of the left wall 2*a*. The outer support portion 24 is positioned below the inner support portion 21. The outer support portion 24 extends rightward from an outer surface of the right wall 2*b*. The outer support portion 24 is positioned below the inner support portion 22. The outer support portions 23, 24 each have a flat upper surface.

The contact device 3 includes a first fixed terminal 6, a second fixed terminal 7, a movable contact piece 8, and a movable mechanism 11.

The first fixed terminal 6 and the second fixed terminal 7 are suitably plate terminals and are comprised of conductive material. The first fixed terminal 6 and the second fixed terminal 7 each extend in the left-right direction and have a bent shape. The first fixed terminal 6 and the second fixed terminal 7 extend across the interior and exterior of the case 2.

The first fixed terminal 6 includes a first fixed contact 6*a*, a contact support portion 6*b*, an extension portion 6*c*, and an external connecting portion 6*e*. The first fixed contact 6*a* is located inside the case 2. The contact support portion 6*b* supports the first fixed contact 6*a*. The extension portion 6*c* extends leftward from the contact support portion 6*b*. The extension portion 6*c* is supported by the upper surface of the inner support portion 21. The external connecting portion 6*e* is exposed outside from the left wall 2*a*. The external connecting portion 6*e* extends in the left-right direction and is supported by the upper surface of the outer support portion 23. The external connecting portion 6*e* is configured to be connected to an external terminal (not shown) such as a bus bar.

The second fixed terminal 7 is positioned apart from the first fixed terminal 6 in the left-right direction. The second fixed terminal 7 includes a second fixed contact 7*a*, a contact support portion 7*b*, an extension portion 7*c*, and an external connecting portion 7*e*. Since the second fixed terminal 7 is bilaterally symmetric with the first fixed terminal 6, detailed description thereof will be omitted.

The movable contact piece 8 is suitably a plate terminal elongated in one direction and comprised of conductive material. The movable contact piece 8 is located inside the case 2. The movable contact piece 8 extends in the left-right direction inside the case 2. The longitudinal direction of the movable contact piece 8 matches the left-right direction. The lateral direction of the movable contact piece 8 matches the front-rear direction.

The movable contact piece 8 includes a first movable contact 8*a*, a second movable contact 8*b*, and an engaging portion 8*c*. The first movable contact 8*a* is arranged to face the first fixed contact 6*a*. The second movable contact 8*b* is arranged to face the second fixed contact 7*a*. The engaging portion 8*c* is formed so as to be recessed inward, at about the center of the movable contact piece 8 in the longitudinal direction, from both ends of the movable contact piece 8 in the lateral direction.

The movable contact piece 8 is movable in the up-down direction. Specifically, the movable contact piece 8 is movable in a movement direction including the first direction and the second direction. The first direction is the direction from the first movable contact 8*a* toward the first fixed contact 6*a*, and corresponds to the upward direction (Z1 direction) in the present embodiment. The second direction is the direction from the first fixed contact 6*a* toward the first movable contact 8*a*, and corresponds to the downward direction (Z2 direction) in the present embodiment.

The movable mechanism 11 includes a drive shaft 31, a spacer 32, a contact spring 33, and a stopper 34, as shown in FIGS. 1 to 5.

Figure 4:
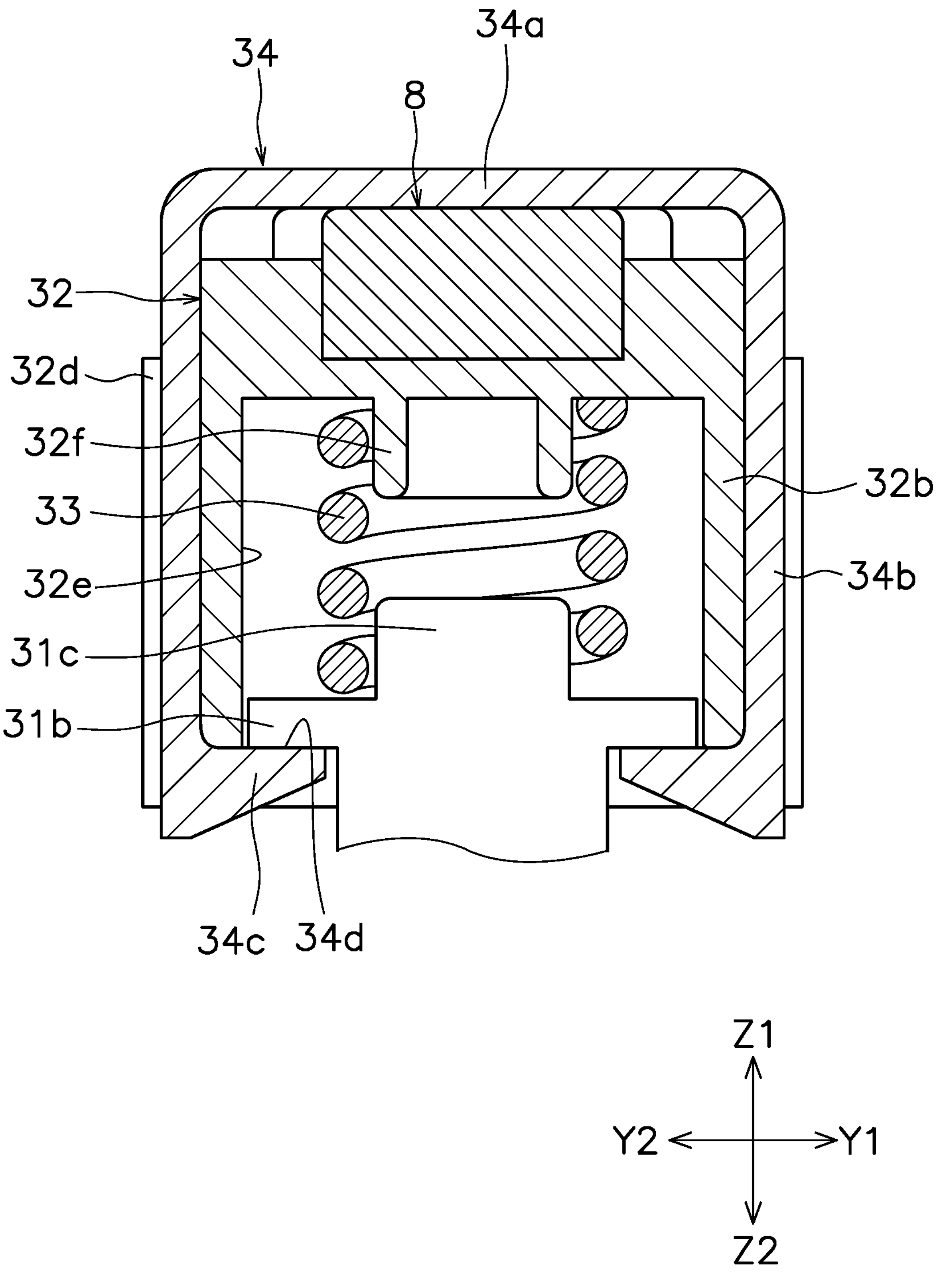
FIG. 4 is a cross-sectional view of a movable contact piece and surrounding components cut along a plane orthogonal to its left-right direction.

The drive shaft 31 is comprised of insulating material such as resin or of a metal. As shown in FIGS. 1 and 4, the drive shaft 31 is spaced apart from the movable contact piece 8 in the downward direction and is not in direct contact with the movable contact piece 8. The drive shaft 31 overlaps the movable contact piece 8 when viewed from the up-down direction.

The drive shaft 31 is movable in the up-down direction relative to the movable contact piece 8, the spacer 32, and the stopper 34.

The drive shaft 31 includes a shaft portion 31*a*, a flange portion 31*b*, and a support protrusion 31*c*. The shaft portion 31*a* extends in the up-down direction. The flange portion 31*b* is formed at the upper end of the drive shaft 31. The flange portion 31*b* protrudes from the shaft portion 31*a* and has a larger outer diameter than the shaft portion 31*a*. The flange portion 31*b* extends in a direction perpendicular to the shaft portion 31*a*. The support protrusion 31*c* protrudes upward from the middle of the flange portion 31*b*. The support protrusion 31*c* has an outer diameter smaller than the outer diameter of the flange portion 31*b*.

The spacer 32 is a generally rectangular box in shape with an opening that faces downward, and it is comprised of insulating material such as resin. The spacer 32 is arranged between the movable contact piece 8 and the drive shaft 31. The spacer 32 has an upper surface in contact with the lower surface of the movable contact piece 8 for supporting the movable contact piece 8 in the downward direction.

Figure 5:
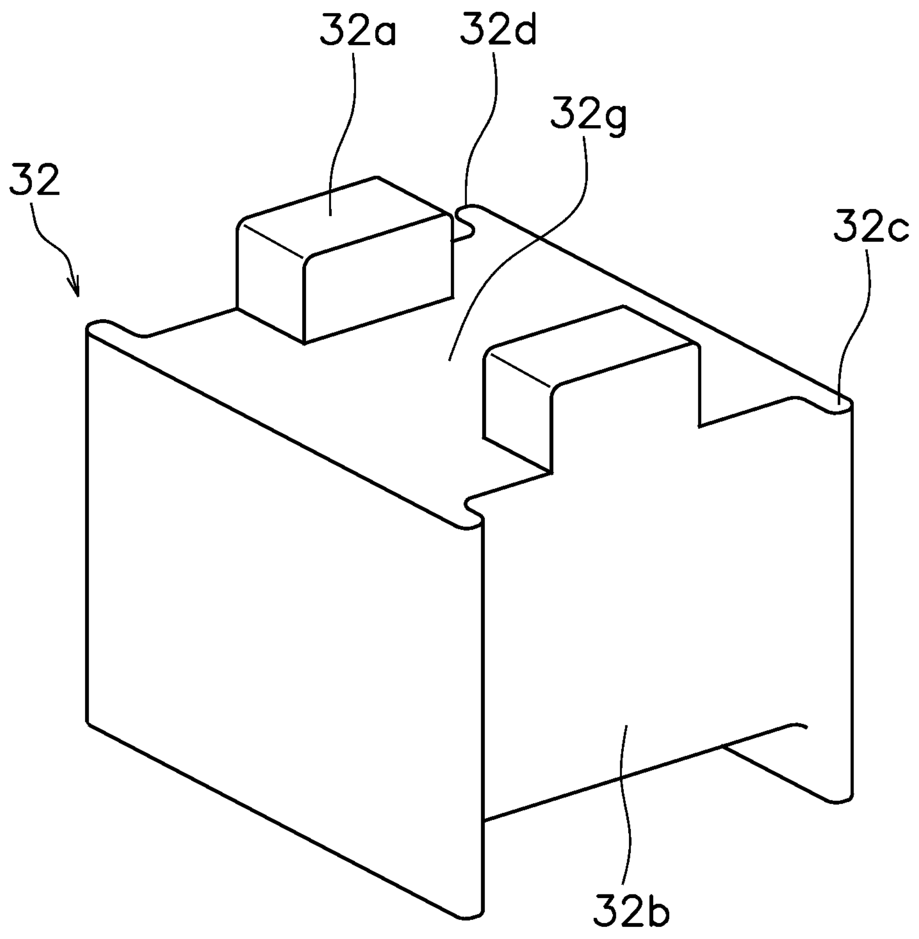
FIG. 5 is a perspective view of a spacer.

The spacer 32 includes a positioning portion 32*a*, a pair of held portions 32*b*, a pair of protrusions 32*c* and 32*d*, a spring receiving portion 32*e*, and a support protrusion 32*f*. The positioning portion 32*a* is formed at the upper surface of the spacer 32. The positioning portion 32*a* is configured to engage with the engaging portion 8*c* of the movable contact piece 8. This configuration decreases the displacement of the movable contact piece 8 with respect to the spacer 32 in the lateral and longitudinal directions. The pair of held portions 32*b* are disposed at the front and rear surfaces of spacer 32 and are held by the stopper 34 in the front-rear direction. The pair of protrusions 32*c* and 32*d* are located at both ends of the pair of held portions 32*b* in the left-right direction. The pair of protrusions 32*c* and 32*d* extend in the up-down direction. The pair of protrusions 32*c* and 32*d* decrease the displacement of the stopper 34 in the left-right direction. Note that, as shown in FIG. 5, the spacer 32 has a gate port 32*g* through which resin is injected to mold the spacer 32. The gate port 32*g* is located at a position that is not exposed outside. In the present embodiment, the gate port 32*g* is located at a position overlying the movable contact piece 8 in the up-down direction and is covered with the movable contact piece 8.

As shown in FIG. 4, the spring receiving portion 32*e* is open in the downward direction and accommodates the contact spring 33 therein. The flange portion 31*b* and the support protrusion 31*c* of the drive shaft 31 are arranged in the spring receiving portion 32*e*. The support protrusion 32*f* protrudes downward from the bottom of the spring receiving portion 32*e*. The support protrusion 32*f* faces the support protrusion 31*c* of the drive shaft 31 in the up-down direction.

The contact spring 33 is arranged between the spacer 32 and the flange portion 31*b* of the drive shaft 31 under compression in the up-down direction. The contact spring 33 urges the spacer 32 and the drive shaft 31 away from each other in the up-down direction. The contact spring 33 is accommodated in the spring receiving portion 32*e*. The contact spring 33 is arranged in contact with the flange portion 31*b* of the drive shaft 31 and the bottom of the spring receiving portion 32*e*. The contact spring 33 is attached, at its upper end, to the support protrusion 32*f* of the spacer 32, and at its lower end attached to the support protrusion 31*c* of the drive shaft 31.

The stopper 34 is connected to spacer 32. The stopper 34 is connected to spacer 32 by snap-fit. In the present embodiment, the stopper 34 is comprised of insulating material such as resin. The stopper 34 has springiness.

Figure 6:
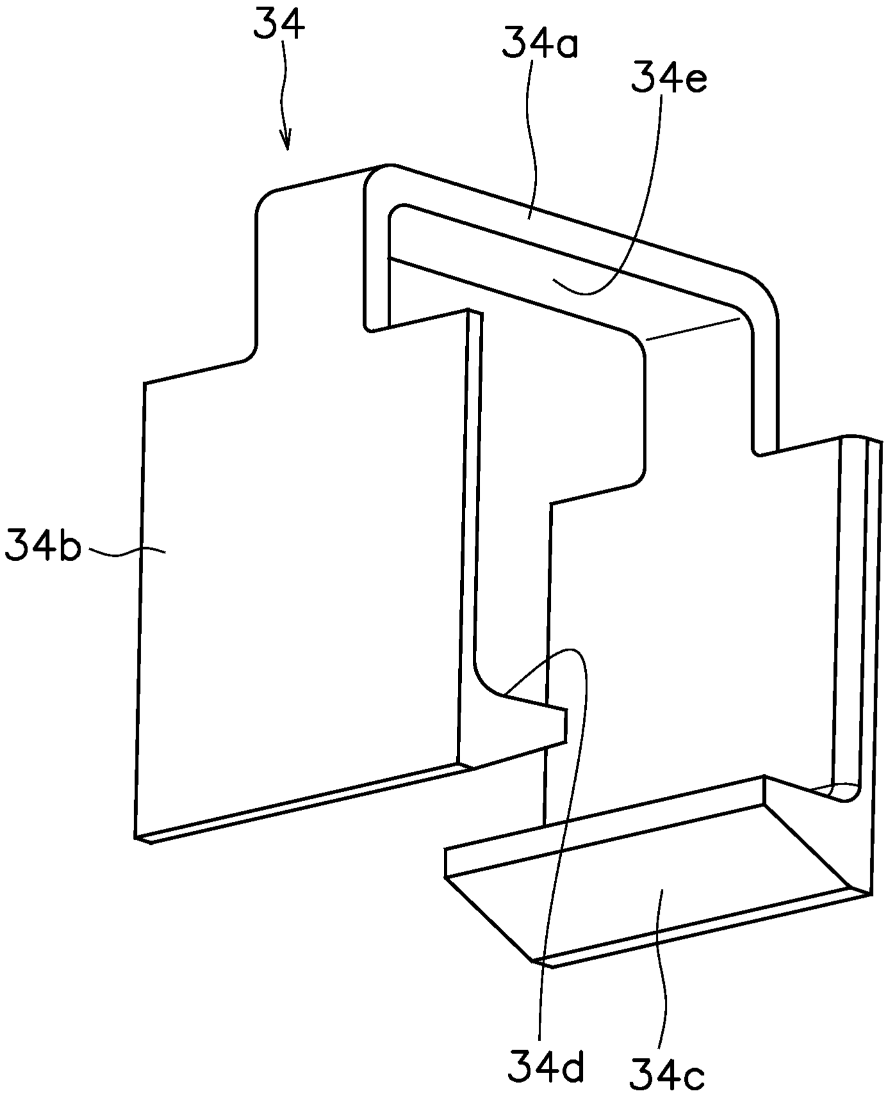
FIG. 6 is a perspective view of a stopper.

As shown in FIG. 6, the stopper 34 includes a holding portion 34*a*, a pair of side portions 34*b*, a pair of claw portions 34*c*, and a pair of press portions 34*d*. The holding portion 34*a* extends in the front-rear direction. The holding portion 34*a* is disposed centrally of the movable contact piece 8 in the longitudinal direction. The holding portion 34*a* is arranged, above the movable contact piece 8, across the movable contact piece 8 in the front-rear direction. The holding portion 34*a* overlaps the engaging portion 8*c* and the positioning portion 32*a* in the up-down direction. The holding portion 34*a* works together with the spacer 32 to hold the movable contact piece 8 in the front-rear direction. That is, the movable contact piece 8 is held by the upper surface of the spacer 32 and the holding portion 34*a* of the stopper 34 in the up-down direction. This configuration allows the movable contact piece 8 to be fixed with respect to the spacer 32 and the stopper 34.

The pair of side portions 34*b* extend downward from both ends of the holding portion 34*a* in the left-right direction. The pair of side portions 34*b* are arranged to face each other in the front-rear direction. The pair of side portions 34*b* sandwich the pair of held portions 32*b* of spacer 32 in the front-rear direction. The pair of side portions 34*b* are engaged with the pair of protrusions 32*c* and 32*d* in the left-right direction. That is, the pair of side portions 34*b* are sandwiched by the pair of protrusions 32*c* and 32*d* in the left-right direction.

The pair of claw portions 34*c* are formed at the lower ends of the pair of side portions 34*b*. The pair of claw portions 34*c* extend from the lower ends of the pair of side portions 34*b* toward the drive shaft 31. The pair of claw portions 34*c* are engaged with the lower ends of the pair of held portions 32*b*. This configuration allows the stopper 34 to be coupled to the spacer 32. Each of the pair of claw portions 34*c* has a flat upper surface. Each of the pair of claw portions 34*c* has a tapered lower surface that is downwardly inclined from inward to outside.

The pair of press portions 34*d* are located on the upper surfaces of the pair of claw portions 34*c*. The pair of press portions 34*d* are pressed downward by the flange portion 31*b* of the drive shaft 31 when the first movable contact 8*a* is spaced from the first fixed contact 6*a* (the state shown in FIG. 1). The pair of press portions 34*d* are not pressed downward by the flange portion 31*b* of the drive shaft 31 when the first movable contact 8*a* is in contact with the first fixed contact 6*a*.

As shown in FIG. 6, the stopper 34 has a gate port 34*e* through which resin is injected to mold the stopper 34. The gate port 34*e* is located at a position that is not exposed to the outside. In the present embodiment, the gate port 34*e* is located, on the lower surface of the holding portion 34*a*, at a position overlapping the movable contact piece 8 in the up-down direction, and is covered with the movable contact piece 8.

The driving device 4 is housed in the case 2. The driving device 4 is configured to move the movable contact piece 8 in the up-down direction via the movable mechanism 11. The driving device 4 moves the drive shaft 31 in the up-down direction so as to move the movable contact piece 8 in the up-down direction. The driving device 4 includes a coil 12, a movable iron core 13, a fixed iron core 14, a yoke 15, and a return spring 16.

When a voltage is applied to the coil 12 to excite it, the coil 12 generates an electromagnetic force that causes the movable iron core 13 to move upward. The movable iron core 13 is fixed to the shaft portion 31*a* of the drive shaft 31 so as to be movable integrally therewith. The fixed iron core 14 is disposed above the movable iron core 13 so as to face the movable iron core 13. The yoke 15 is arranged to surround the coil 12. The yoke 15 is connected to the fixed iron core 14. The return spring 16 urges the movable iron core 13 downward.

Figure 3:
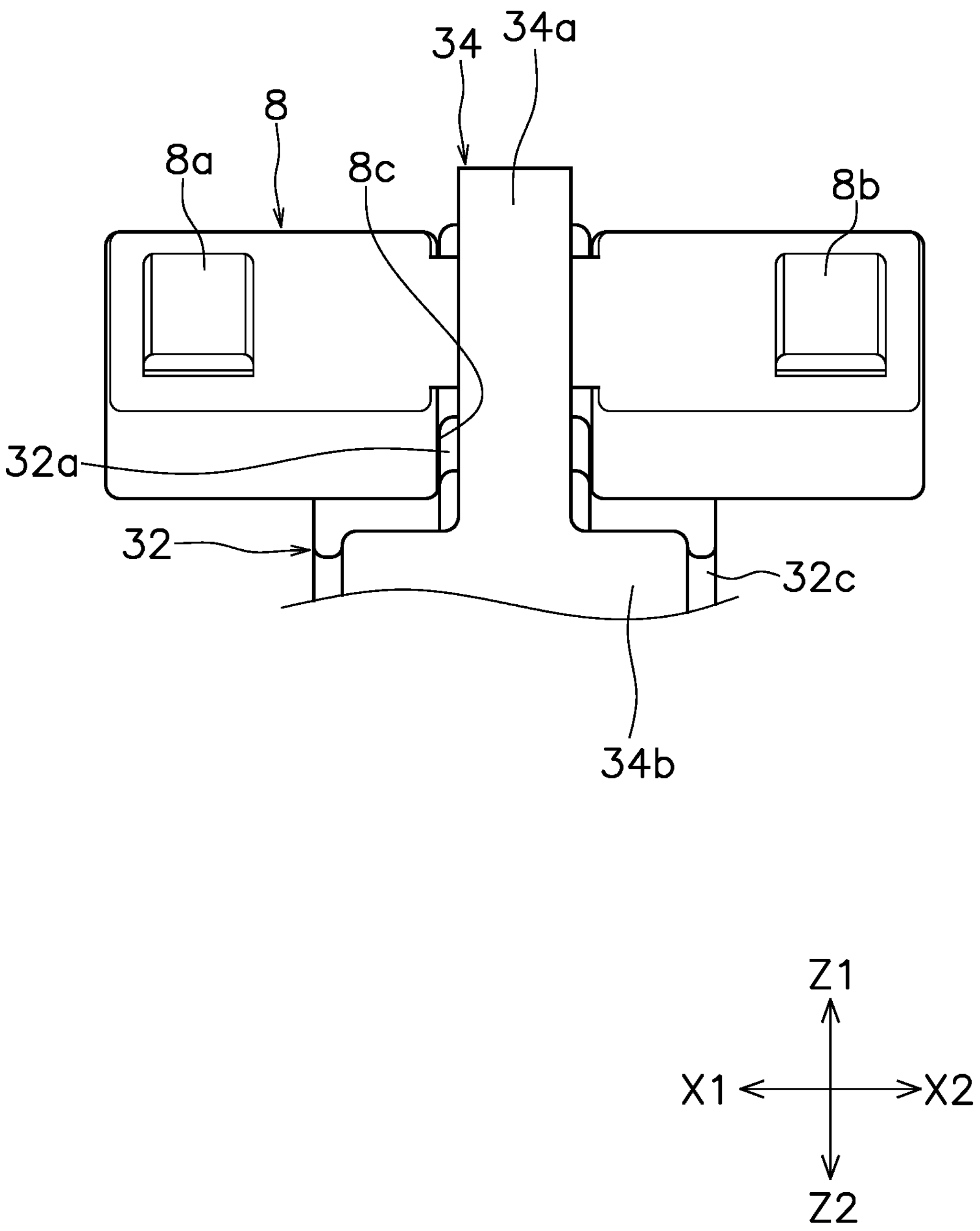
FIG. 3 is a perspective view of a movable contact piece and surrounding components.

The operation of the electromagnetic relay 100 is generally the same as before, and thereby its description will be given only briefly below. FIG. 3 shows a state in which the coil 12 is not energized. In this state, the first movable contact 8*a* is spaced from the first fixed contact 6*a*, and the second movable contact 8*b* is spaced from the second fixed contact 7*a*. When the coil 12 is excited, the movable iron core 13 moves upward together with the drive shaft 31 against the biasing force of the return spring 16. As the drive shaft 31 moves, the movable contact piece 8 is urged upward via the contact spring 33 and the spacer 32, and the movable contact piece 8 moves upward. As a result, the first movable contact 8*a* comes into contact with the first fixed contact 6*a*, and the second movable contact 8*b* comes into contact with the second fixed contact 7*a*.

When the voltage application to the coil 12 is stopped, the biasing force of the return spring 16 causes the drive shaft 31 to move downward together with the movable iron core 13. As a result, the flange portion 31*b* of the drive shaft 31 presses the pair of press portions 34*d* of the stopper 34, which thereby moves the movable contact piece 8 downward to separate the first movable contact 8*a* from the first fixed contact 6*a* and to separate the second movable contact 8*b* from the second fixed contact 7*a*.

Figure 7:
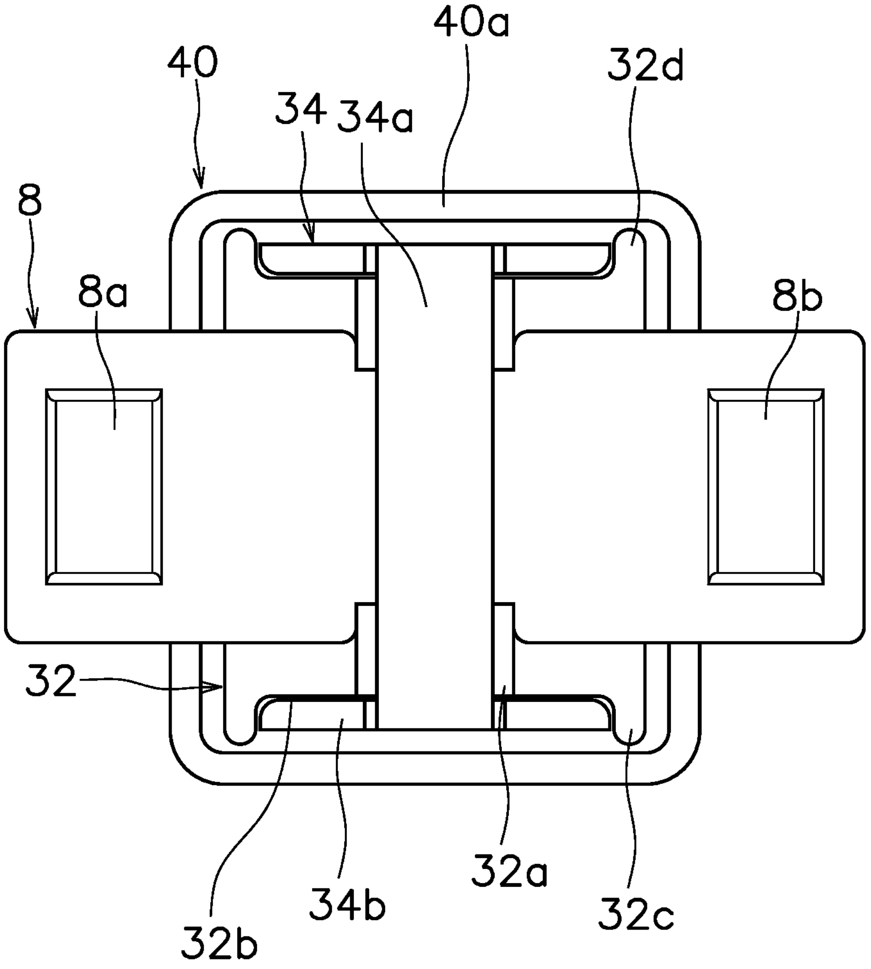
FIG. 7 is a top view of a movable contact piece and surrounding components.

The electromagnetic relay 100 further includes an inner member 40. The inner member 40 guides movement of the movable mechanism 11. The inner member 40 is disposed above the coil 12. The inner member 40 is a generally rectangular box in shape having an upward opening, and is partially or entirely comprised of insulating material such as resin. As shown in FIG. 7, the inner member 40 includes a wall portion 40*a* arranged to surround the pair of side portions 34*b* in the front-rear direction. The wall portion 40*a* is arranged to face the pair of side portions 34*b* in the front-rear direction. The wall portion 40*a* limits the pair of side portions 34*b* from opening in the direction away from the pair of held portions 32*b*. That is, the wall portion 40*a* limits the pair of claw portions 34*c* from coming off the pair of held portions 32*b* and the snap-fitting connection between stopper 34 and the spacer 32 from coming apart.

In the electromagnetic relay 100 configured as described above, the drive shaft 31 is disposed apart from the movable contact piece 8, and the contact spring 33 is disposed between the spacer 32 and the drive shaft 31. That is, the movable contact piece 8 is not in direct contact with the drive shaft 31 and the contact spring 33, and no abrasion powder is generated due to sliding of the movable contact piece 8 with the drive shaft 31 and the contact spring 33. As a result, generation of abrasion powder from the movable contact piece can be decreased. Also, the stopper 34 is pressed downward by the flange portion 31*b* of the drive shaft 31 in a state where the first movable contact 8*a* is spaced from the first fixed contact 6*a*. Thus, the movable contact piece 8 is able to be firmly fixed to the spacer 32 by the stopper 34 in the up-down direction.

In addition, since the movable contact piece 8 is fixed to the spacer 32 by snap-fit connection between the stopper 34 and the spacer 32, the movable contact piece 8 can be easily fixed to the spacer 32. Moreover, the manufacturing cost can be reduced compared to the case where the spacer 32 and the movable contact piece 8 are fixed by insert molding, for example. In addition, since the stopper 34 is comprised of insulating material, the stopper 34 ensures insulation between the contact device 3 and the driving device 4.

An embodiment of the electromagnetic relay according to one aspect of the claimed invention has been described above, but the claimed invention is not limited to the above embodiment, and various modifications can be made without departing from the scope of the invention.

Figure 8:
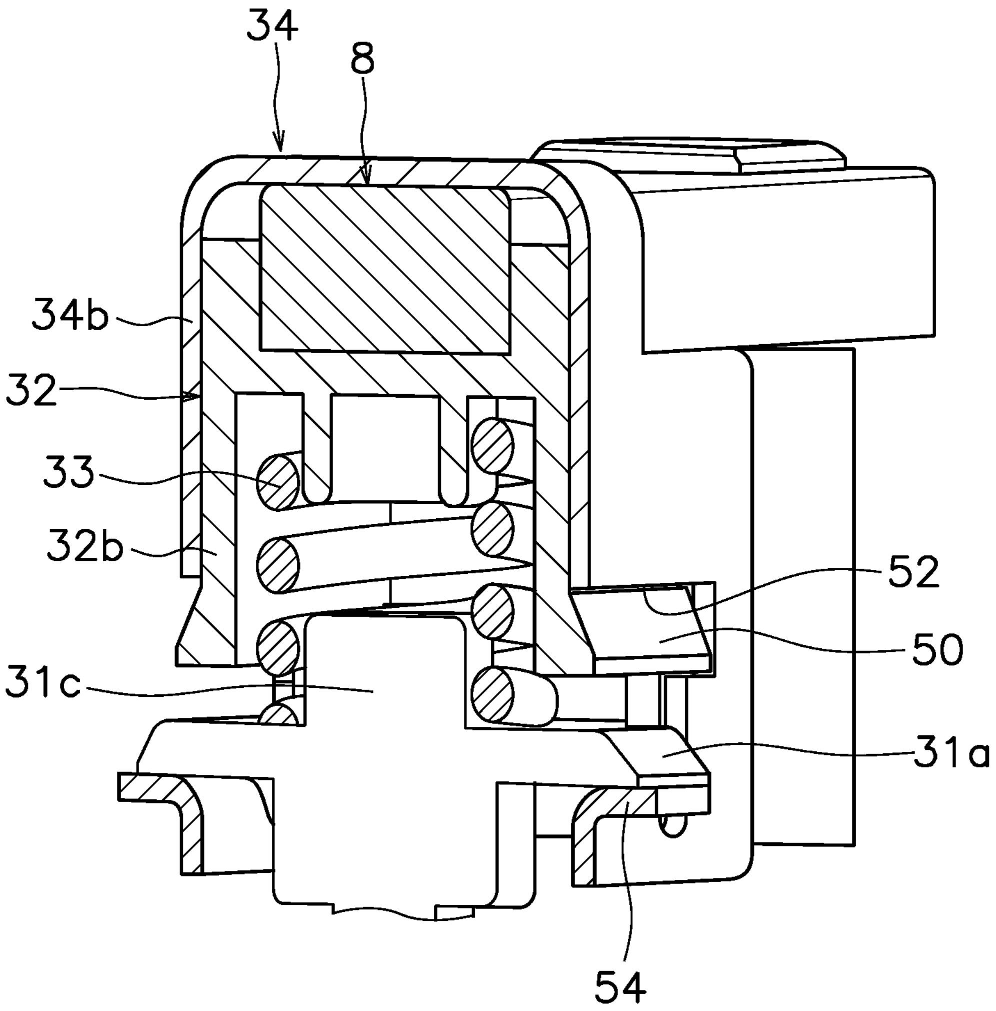
FIG. 8 is a cross-sectional perspective view of a movable contact piece and surrounding components according to a modified embodiment.

As shown in FIG. 8, for example, the shapes of spacer 32 and stopper 34 may be changed. In FIG. 8, the stopper 34 is comprised of metal. The spacer 32 includes a pair of claw portions 50. The pair of claw portions 50 are located at the lower ends of the pair of held portions 32*b*. The pair of claw portions 50 protrude outwardly. The stopper 34 includes an engaging portions 52 with which the pair of claw portions 50 are engaged, and a pair of press portions 54 pressed against the flange portion 31*b* of the drive shaft 31. The engaging portions 52 are openings through the pair of side portions 34*b* in the front-rear direction. The pair of press portions 54 are positioned below the engaging portions 52. The pair of press portions 54 are formed by cutting and bending part of the pair of side portions 34*b*.

REFERENCE NUMERALS

4 Driving device
6 First fixed terminal
6*a* First contact piece
7 second fixed terminal
7*a* second contact piece
8 Movable contact piece
8*a* First movable contact
8*b* second movable contact
31 Drive shaft
31*a* Shaft portion
31*b* Flange portion
32 Spacer
33 Contact spring
34 Stopper
34*a* Holding portion
34*d* A pair of press portion (Example of press portion)
100 Electromagnetic relay

The invention claimed is:

1. An electromagnetic relay, comprising:

a first fixed terminal including a first fixed contact;

a second fixed terminal including a second fixed contact;

a movable contact piece including a first movable contact disposed to face the first fixed contact and a second movable contact disposed to face the second fixed contact, the movable contact piece being movable in a movement direction including a first direction from the first movable contact toward the first fixed contact and a second direction from the first fixed contact toward the first movable contact;

a drive shaft including a shaft portion extending in the movement direction and a flange portion projecting from the shaft portion, the drive shaft being spaced apart from the movable contact piece in the second direction;

a spacer disposed between the movable contact piece and the drive shaft;

a contact spring disposed between the spacer and the drive shaft, the contact spring configured to urge the spacer and the drive shaft away from each other in the movement direction;

a stopper connected to the spacer, the stopper including a holding portion and a press portion, the holding portion configured to hold, together with the spacer, the movable contact piece in the movement direction, the press portion configured to be pressed in the second direction by the flange portion of the drive shaft in a state where the first movable contact is separated from the first fixed contact; and a driving device configured to move the drive shaft in the movement direction.

2. The electromagnetic relay according to claim 1, wherein the spacer includes a positioning portion to position the movable contact piece in a longitudinal direction and a lateral direction of the movable contact piece, and the movable contact piece includes an engaging portion configured to engage with the positioning portion.

3. The electromagnetic relay according to claim 1, wherein the stopper is connected to the spacer by snap-fit.

4. The electromagnetic relay according to claim 3, wherein the spacer includes a pair of held portions configured to be held by the stopper in a lateral direction of the movable contact piece, and the stopper further includes a pair of side portions to hold the pair of held portions, and a pair of claw portions to engage with ends of the pair of held portions in the second direction.

5. The electromagnetic relay according to claim 4, wherein the pair of claw portions each have a surface directed in the second direction, the surface inclining in the second direction from an inside to an outside.

6. The electromagnetic relay according to claim 4, further comprising a wall arranged to surround the pair of side portions in the lateral direction of the movable contact piece.

7. The electromagnetic relay according to claim 4, wherein the press portion of the stopper is formed on the pair of claw portions.

8. The electromagnetic relay according to claim 1, wherein the stopper is comprised of insulating material.

9. The electromagnetic relay according to claim 1, wherein the spacer includes a gate port into which resin is injected to mold the stopper, and the gate port of the spacer is covered with the movable contact piece.

10. The electromagnetic relay according to claim 1, wherein the stopper has a gate port into which resin is injected to mold the stopper, and the gate port of the stopper is covered with the movable contact piece.

11. The electromagnetic relay according to claim 1, wherein the spacer includes a spring receiving portion that is open in the second direction, and the flange portion is located in the spring receiving portion.

* * * * *